(12) United States Patent
Faruque et al.

(10) Patent No.: US 11,975,675 B2
(45) Date of Patent: May 7, 2024

(54) BODY-MOUNTED SIDE AIRBAG BELOW SEAT BOTTOM

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 17/674,959

(22) Filed: Feb. 18, 2022

(65) Prior Publication Data
US 2023/0264645 A1    Aug. 24, 2023

(51) Int. Cl.
*B60R 21/2338* (2011.01)
*B60R 21/231* (2011.01)
*B60R 21/233* (2006.01)

(52) U.S. Cl.
CPC .... *B60R 21/2338* (2013.01); *B60R 21/23138* (2013.01); *B60R 21/233* (2013.01)

(58) Field of Classification Search
CPC .......... B60R 21/2338; B60R 21/23138; B60R 21/233; B60R 2021/23386
See application file for complete search history.

(56) References Cited

U.S. PATENT DOCUMENTS

| | | | |
|---|---|---|---|
| 4,966,388 A | 10/1990 | Warner et al. | |
| 5,752,713 A * | 5/1998 | Matsuura | B60R 21/23138 280/730.2 |
| 5,957,493 A * | 9/1999 | Larsen | B60R 21/2346 280/730.2 |
| 6,308,982 B1 * | 10/2001 | Wallner | B60R 21/2338 280/730.2 |
| 6,431,588 B1 * | 8/2002 | Bayley | B60R 21/232 280/730.2 |
| 6,709,010 B2 * | 3/2004 | Dominissini | B60R 22/1953 280/730.2 |
| 7,322,600 B2 * | 1/2008 | Inoue | B60R 21/232 280/730.2 |
| 7,712,774 B2 * | 5/2010 | Garner | B60R 21/213 280/730.2 |
| 9,994,182 B1 | 6/2018 | Jaradi et al. | |
| 10,682,972 B2 * | 6/2020 | Faruque | B60R 21/08 |
| 10,821,928 B2 | 11/2020 | Deng et al. | |

(Continued)

FOREIGN PATENT DOCUMENTS

KR    100526149 B1    11/2005
WO    WO-0240322 A1 *    5/2002    ........... B60R 21/232

*Primary Examiner* — Jason D Shanske
*Assistant Examiner* — Joselynn Y Sliteris
(74) *Attorney, Agent, or Firm* — Franks A. MacKenzie; Bejin Bieneman PLC (57) ABSTRACT

An assembly includes a vehicle body including a body side. A front seat and a rear seat are adjacent to the body side. The front seat and the rear seat each include a seat bottom and a seat back that extends upwardly from the seat bottom. A side airbag is mounted to the vehicle body below the seat bottom of the front seat and the rear seat. A tether retractor is mounted to the vehicle body above the seat bottom of the front seat and the seat bottom of the rear seat. A tether extends from the side airbag to the tether retractor.

20 Claims, 6 Drawing Sheets

(56) References Cited

U.S. PATENT DOCUMENTS

| | | | |
|---|---|---|---|
| 10,906,496 B2 | 2/2021 | Baccouche et al. | |
| 11,059,448 B2 * | 7/2021 | Rutelin | B60R 21/216 |
| 11,097,680 B2 | 8/2021 | Jayakar et al. | |
| 11,148,631 B2 * | 10/2021 | Jaradi | B60R 21/205 |
| 11,214,227 B2 * | 1/2022 | Jayakar | B60R 21/232 |
| 2002/0070537 A1 * | 6/2002 | Webber | B60R 21/232 |
| | | | 280/730.2 |
| 2021/0078517 A1 | 3/2021 | Fischer et al. | |

* cited by examiner

BODY-MOUNTED SIDE AIRBAG BELOW SEAT BOTTOM

BACKGROUND

Vehicles are equipped with airbag assemblies that include an airbag and an inflator. In the event of a vehicle impact, the inflator activates and provides inflation medium to the airbag. This pressurizes the airbag to control the kinematics of an occupant during the vehicle impact. The airbag assemblies may be located at various positions in passenger compartment of the vehicle. Vehicles may include airbags supported on a dash, side air curtains mounted to roof rails, seat-mounted airbag, etc.

A vehicle may include amenities that allow occupants to face one another during operation of the vehicle. As one example, an autonomous vehicle may be autonomously operated, allowing occupants of the vehicle to ride in the vehicle without monitoring the operation of the vehicle. Specifically, the autonomous vehicle may include seats free to rotate between rides of the vehicle between forward-facing and rearward-facing positions. The airbag assemblies may be positioned to control the kinematics of the occupants in various seat positions.

DETAILED DESCRIPTION

An assembly includes a vehicle body having a body side and front seat and a rear seat adjacent the body side. The front seat and the rear seat each include a seat bottom and a seatback extending upwardly from the seat bottom. A side airbag is mounted to the vehicle body below the seat bottom of the front seat and the rear seat. A tether retractor is mounted to the vehicle body above the seat bottoms of the front seat and the rear seat. A tether extends from the side airbag to the tether retractor.

The side airbag is inflatable to an inflated position. The side airbag in the inflated position may include a first inflatable chamber between the front seat and the body side and a second inflatable chamber between the rear seat and the body side. An uninflatable panel may be between the first inflatable chamber and the second inflatable chamber. The tether may be connected to the uninflatable panel.

The body side may include a front door opening and a rear door opening. In such an example, the side airbag is inflatable to an inflated position extending across the front door opening and the rear door opening. The side airbag may include a first inflatable chamber at the front door opening and a second inflatable chamber at the rear door opening in the inflated position.

The body side may include a front door opening, a rear door opening, and a pillar between the front door opening and the rear door opening. In such an example, the tether retractor is mounted to the pillar. The side airbag may be inflatable to an inflated position extending across the front door opening and the rear door opening. The side airbag may include a first inflatable chamber at the front door opening and a second inflatable chamber at the rear door opening in the inflated position. The side airbag may include an uninflatable panel between the first inflatable chamber and the second inflatable chamber. In such an example, the uninflatable panel is at the pillar when the side airbag is in the inflated position.

The vehicle body includes a floor and the side airbag may be inflatable upwardly from the floor.

The tether retractor may be pyrotechnically activated.

The tether retractor may be mounted to the vehicle body above the seatbacks of the front seat and the rear seat.

The assembly may include a front seat and a rear seat and, in such an example, the side airbag may be inflatable to an inflated position between the front seat and the body side and between the rear seat and the body side. The side airbag may include a first inflatable chamber adjacent the front seat and a second inflatable chamber adjacent the rear seat in the inflated position.

The body side may include a front door opening and a rear door opening and, in such an example, the first inflatable chamber is between the front door opening and the front seat in the inflated position and the second inflatable chamber is between the rear door opening and the rear seat in the inflated position. The body side may include a pillar between the front door opening and the rear door opening and, in such an example, the tether retractor may be mounted to the pillar.

The side airbag may be inflatable upwardly along the seatback of the front seat and the seatback of the rear seat.

With reference to the Figures, wherein like numerals indicate like parts throughout the several views, an assembly of a vehicle 32 includes a vehicle body 12 including a body side 14. A front seat 18 and a rear seat 20 are adjacent to the body side 14. The front seat 18 and the rear seat 20 each include a seat bottom 22 and a seat back 24 that extends upwardly from the seat bottom 22. A side airbag 26 is mounted to the vehicle body 12 below the seat bottom 22 of the front seat 18 and the rear seat 20. A tether retractor 28 is mounted to the vehicle body 12 above the seat bottom 22 of the front seat 18 and the seat bottom 22 of the rear seat 20. A tether 30 extends from the side airbag 26 to the tether retractor 28.

Since the side airbag 26 is mounted to the vehicle body 12 below the seat bottom 22 of the front seat 18 and the seat bottom 22 of the rear seat 20, the side airbag 26 is positioned to control the kinematics of occupants of both the front seat 18 and the rear seat 20 in an inflated position. In examples in which the front seat 18 and/or the rear seat 20 is rotatable, the side airbag 26 may control the kinematics of occupants in any facing position of the front seat 18 and/or the rear seat 20, e.g., a forward-facing position and a rearward-facing position. In an uninflated position of the side airbag 26, the mounting of the side airbag 26 to the vehicle body 12 below both the seat bottom 22 of the front seat 18 and the seat bottom 22 of the rear seat 20 alleviates packaging constraints and accommodates the operation of the side airbag 26 to control the kinematics of occupants of both the front seat 18 and the rear seat 20. The mounting of the tether retractor 28 above the seat bottom 22 of the front seat 18 and the seat bottom 22 of the rear seat 20 ensures upward deployment of the side airbag 26 along the front seat 18 and rear seat 20 and provides, at least in part, for the alleviation of packaging constraints.

In the example shown in the Figures, the vehicle 32 includes two side airbags 26, specifically, one side airbag 26 at each body side 14. These two airbags may be identical and/or function identically. For both of the side airbags 26, common numerals are used to identify common elements.

The vehicle 32 may be any suitable type of automobile, e.g., a passenger or commercial automobile such as a sedan, a coupe, a truck, a sport utility, a crossover, a van, a minivan, a taxi, a bus, etc. The vehicle 32, for example, may be autonomous. In other words, the vehicle 32 may be autonomously operated such that the vehicle 32 may be driven without constant attention from the driver, i.e., the vehicle 32 may be self-driving without human input.

Figure 1:
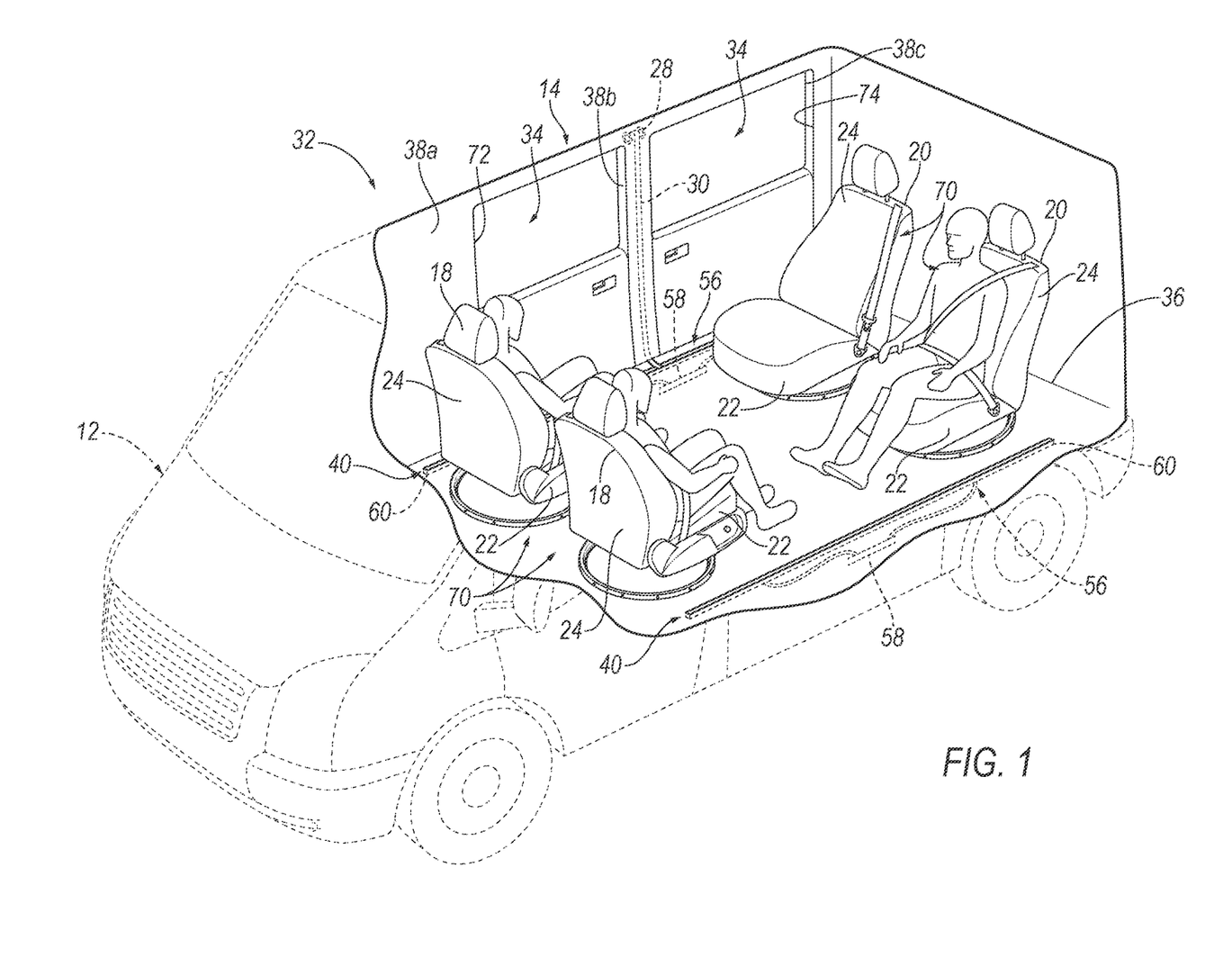
FIG. 1 is a perspective view of a vehicle with two airbag assemblies in uninflated positions shown in broken lines.
Figure 2:
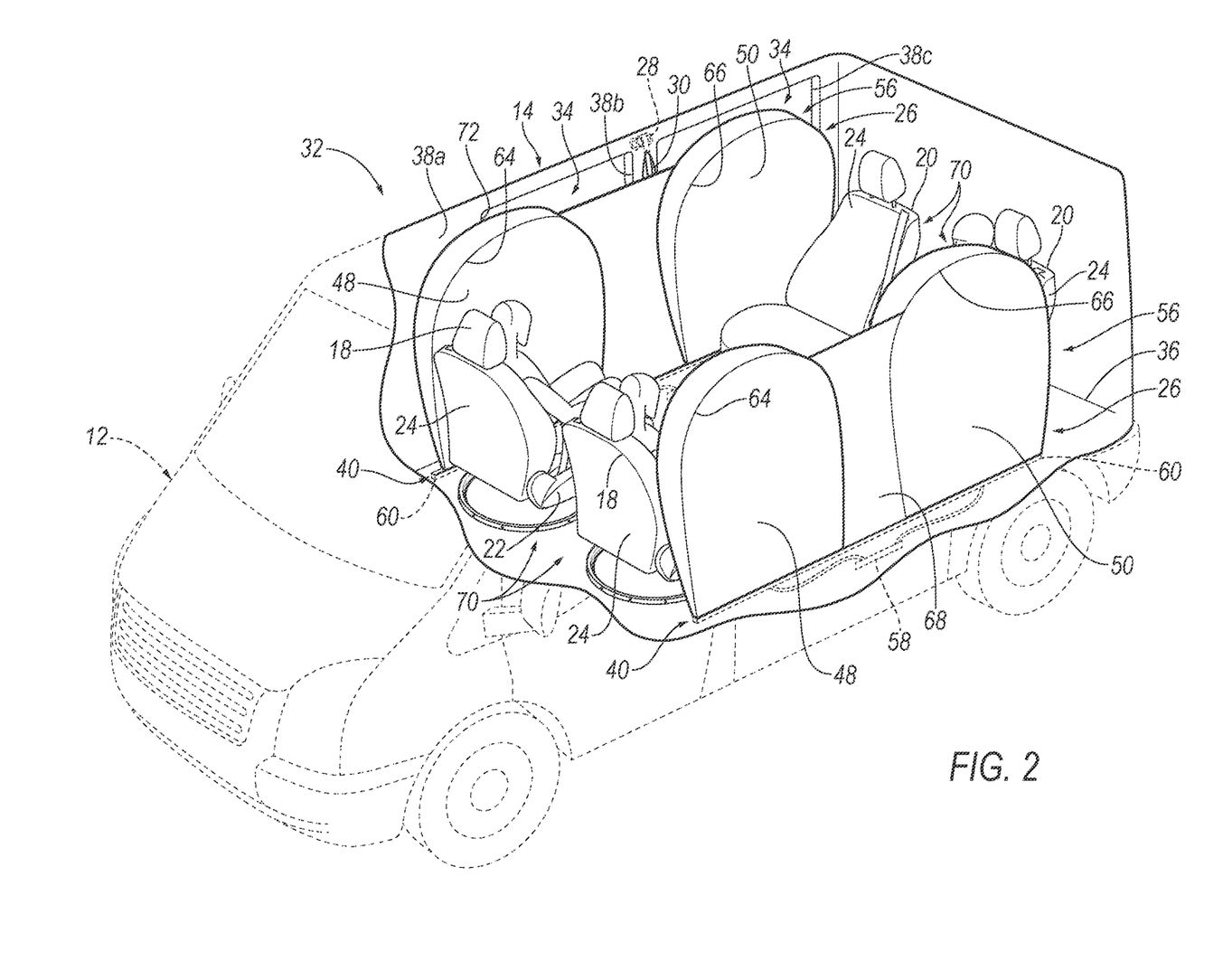
FIG. 2 is a perspective view of the vehicle with the airbag assemblies in the inflated position.
Figure 3:
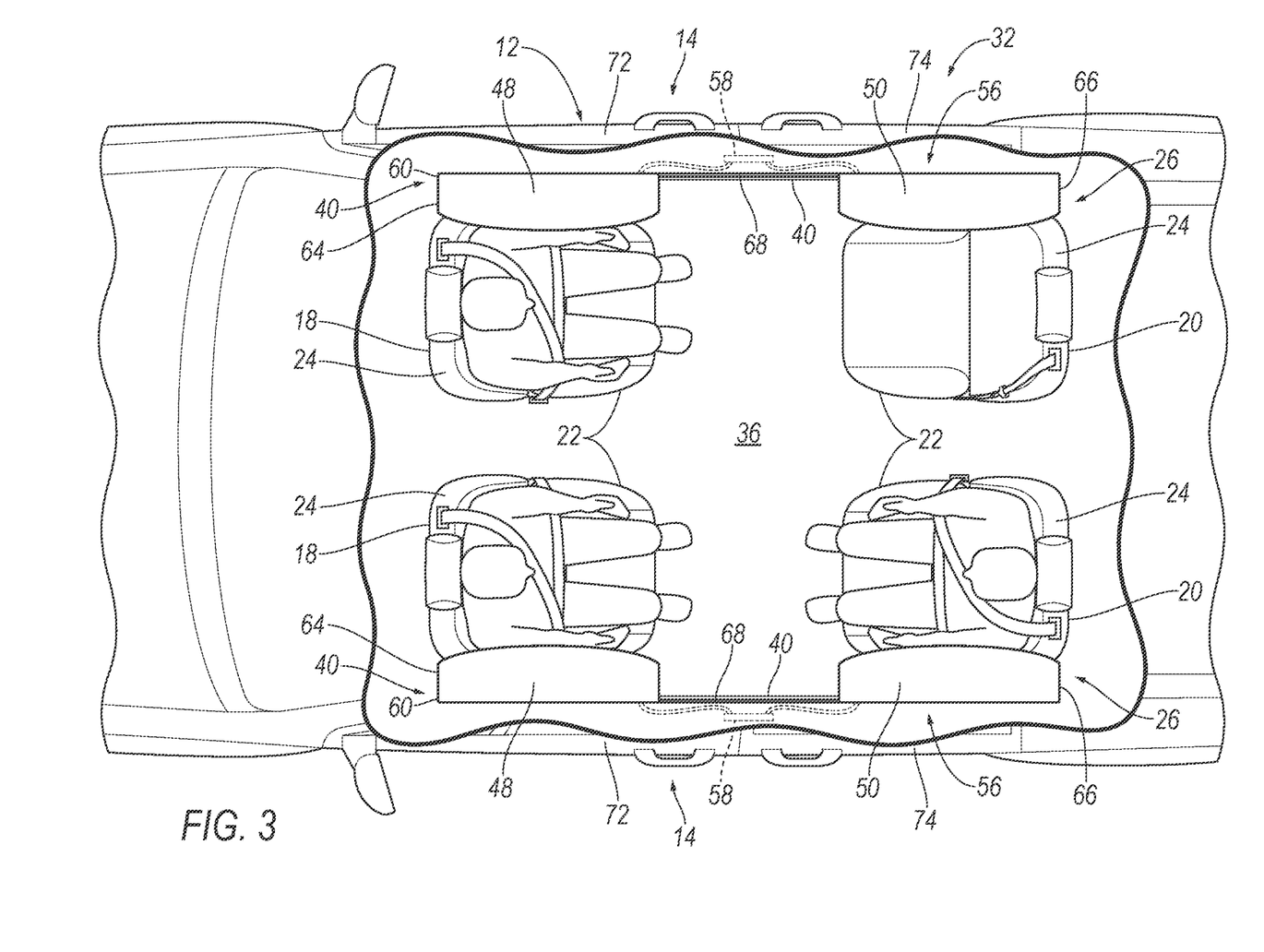
FIG. 3 is a plan view of the vehicle with the airbag assemblies in the inflated position.
Figure 4:
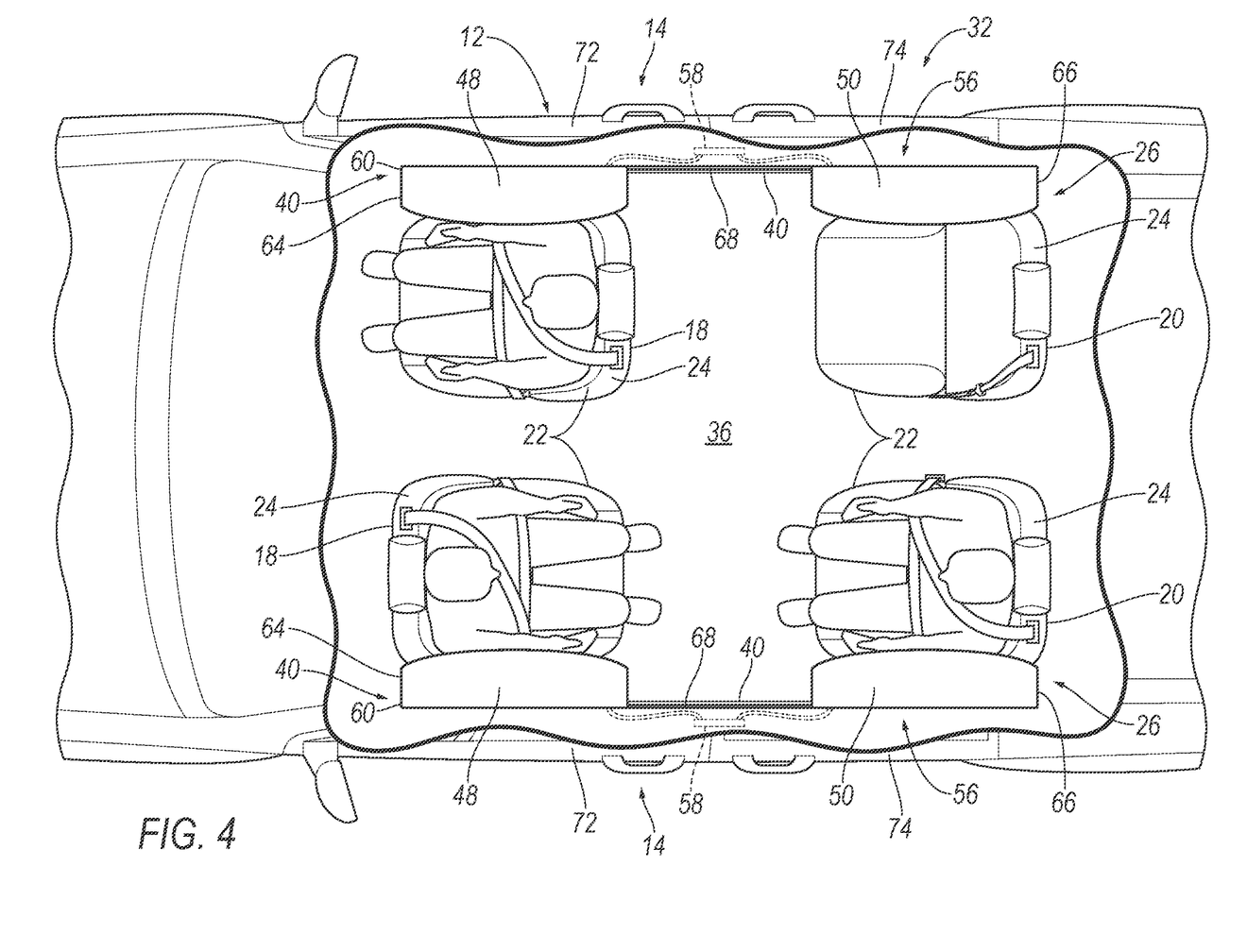
FIG. 4 is a plan view of the vehicle of FIG. 3 with one of the seats facing a different direction.
Figure 5:
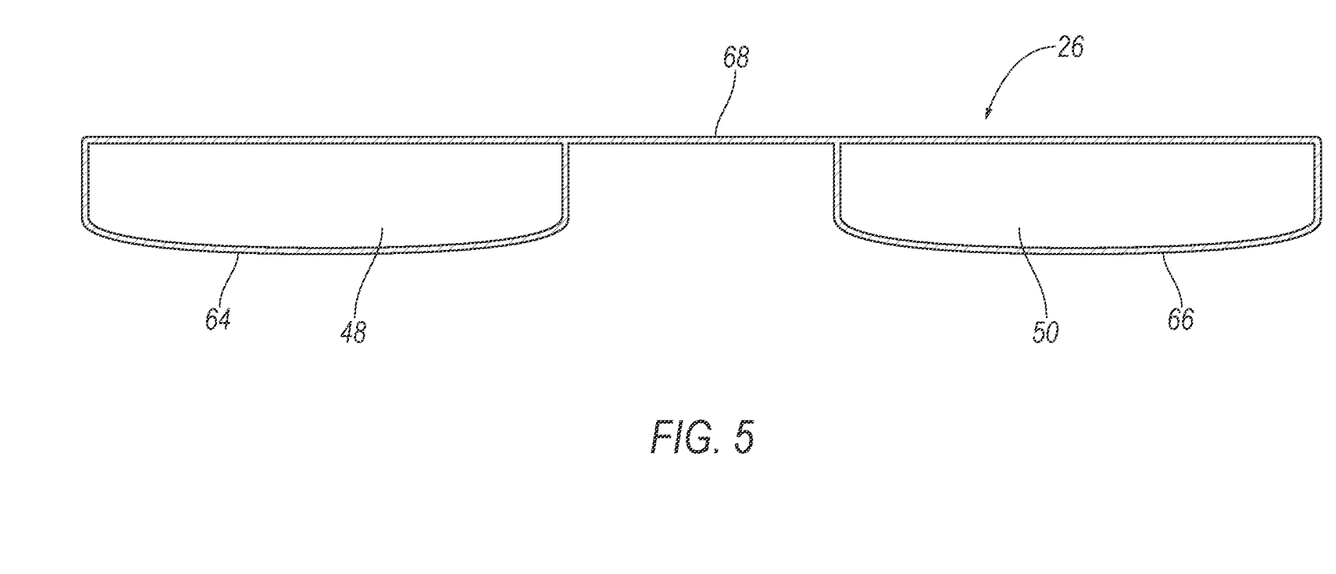
FIG. 5 is cross-sectional view of the side airbag in the inflated position.

With reference to FIG. 1, the vehicle 32 includes a vehicle body 12. The vehicle body 12 may be of a unibody construction, a body-on-frame construction, or any suitable construction. In the unibody construction, the vehicle body 12 serves as a frame, and the vehicle body 12 (includes the rockers, pillars 38, roof rails, etc.) is unitary, i.e., a continuous one-piece unit. As another example, in body-on-frame construction (also referred to as a cab-on-frame construction), the vehicle body 12 and frame are separate components, i.e., are modular, and the vehicle body 12 is supported on and affixed to the frame. Alternatively, the vehicle body 12 may have any suitable construction. The vehicle body 12 may be of any suitable material, for example, steel, aluminum, etc.

The vehicle body 12 defines a passenger compartment (not numbered) to house occupants, if any, of the vehicle 32. The passenger compartment may extend across the vehicle 32, i.e., from one side to the other side of the vehicle 32. The passenger compartment includes a front end and a rear end with the front end being in front of the rear end during forward movement of the vehicle 32. The passenger compartment may house one or more seats 18, 20.

With reference to the Figures, the vehicle body 12 includes a body side 14. Specifically, the vehicle body 12 includes two body sides 14 spaced cross vehicle 32 from each other. The body side 14 is a side of the body located vehicle-outboard of the passenger compartment. The body side 14 includes one or more door openings 34. A floor 36 of the vehicle 32 extends from one body side 14 to the other body side 14 and a roof of the vehicle 32 extends from one body side 14 to the other body side 14.

The vehicle body 12, specifically each body side 14, may include pillars 38. The pillars 38 on the same body side 14 are separated by one of the door openings 34. For example, the vehicle body 12 may include an A-pillar 38a (also referred to as a first pillar) and a B-pillar 38b (also referred to as a second pillar) on each side of the vehicle 32. The A-pillar 38a may extend between a windshield and a front door 72 and the B-pillars 38b may extend behind the front doors 72, e.g., between adjacent doors. In other words, the B-pillars 38b may be spaced from the A-pillar 38a by a front one of the door openings 34. The vehicle 32 may include additional pillars 38, e.g., C-pillars, D-pillars. As an example, a C-pillar 38c may be spaced from the B-pillar 38b by a rear door opening 34. The pillars 38 may extend from the roof to the floor 36.

The body side 14 includes the door opening 34. The front door opening 34 may be between the A-pillar 38a and the B-pillar 38b and between a sill 40 and the roof. Specifically, the front door opening 34 extends from the A-pillar 38a to the B-pillar 38b and from the sill 40 to the roof. The door opening 34 extends uninterrupted from the A-pillar 38a to the B-pillar 38b. The door opening 34 extends uninterrupted from the sill 40 to the roof. The door opening 34 allows for ingress and egress into the passenger compartment. The vehicle 32 may include any suitable number of door openings 34 to allow for ingress and egress into the passenger compartment. For example, the vehicle 32 may include one door opening 34 on each side of the vehicle 32. In other examples, the vehicle 32 may include multiple door openings 34 on each side of the vehicle 32.

The vehicle body 12 includes the floor 36 and may include the roof spaced from the floor 36 along the vertical axis. Specifically, the floor 36 is below the roof. The roof may define an upper boundary of the passenger compartment and may extend from the front end of the passenger compartment to the rear end of the passenger compartment. The floor 36 may define the lower boundary of the passenger compartment and may extend from the front end of the passenger compartment to the rear end of the passenger compartment. That is, the passenger compartment may extend from the floor 36 to the roof.

The floor 36 may include the sill 40 and a floor panel (not numbered). Specifically, the floor 36 may include two sills 40, one on each side of the floor panel. The sills 40 are elongated along the vehicle-longitudinal axis, e.g., between wheels of the vehicle 32. The sill 40 may support the door of the vehicle 32 in a closed position.

The floor 36 may include upholstery, for example, carpet, and may have a class-A surface facing the passenger compartment, i.e., a surface specifically manufactured to have a high quality, finished, aesthetic appearance free of blemishes. The side airbag 26 in the uninflated position may be underneath the upholstery and inflatable upwardly from the floor 36, as described further below.

As set forth above, the vehicle body 12 includes at least one door opening 34. Specifically, the body side 14 includes the door opening 34. In the example shown in the figures, both body sides 14 include the door opening 34. Specifically, each body side 14 includes two door openings 34, namely the front door opening 34 and the rear door opening 34. The front door opening 34 is vehicle-forward of the rear door opening 34.

The vehicle 32 includes a plurality of doors, specifically, one door at each door opening 34. The doors are openable for occupants to enter and exit the passenger compartment. The roof contacts a top edge of the doors when the doors are closed. Each door may include at least one door panel and the door-trim panel supported on the door panel. Specifically, the door may include two panels, namely a door inner 48 and a door outer 50. In such an example, the door-trim panel and the door outer 50 are fixed to the door inner 48. The door-trim panel is positioned opposite the door outer 50 relative to the door frame. The door-trim panel is inboard relative to the door inner 48, and the door outer 50 is outboard relative to the door. The door includes a window opening that may be completely closed by a window if the window is in a fully raised position. The window opening is defined by the door-trim panel and door outer 50 on a bottom edge and either by the door inner 48 circumscribing the window opening or by the vehicle body 12, e.g., the A-pillar 38a, the B-pillar 38b, and the roof rail. The door outer 50 faces outboard relative to the vehicle 32. The door outer 50 may define a portion of the exterior of the vehicle 32. For example, the door outer 50 may present a class-A surface, i.e., a surface specifically manufactured to have a high-quality, finished aesthetic appearance free of blemishes. The door outer 50 may be metal (such as steel, aluminum, etc.) or polymeric (such as fiber reinforced plastic composite, etc.). The door inner 48 may be metal (such as steel, aluminum, etc.) or polymeric (such as fiber reinforced plastic composite, etc.). The door inner 48 provides structural rigidity for the door outer 50. The door inner 48 may provide a mounting location for components of the door.

The vehicle 32 includes one or more seats 18, 20. The seats 18, 20 may be arranged in the passenger compartment in any suitable position, i.e., as front seats 18, rear seat 20, third-row seats etc. The seat 18, 20 may be movable relative to the floor 36 to various positions, e.g., movable fore-and-aft and/or cross-vehicle 32. The seats 18, 20 may be of any suitable type, e.g., a bucket seat 18, 20 as shown in FIG. 1.

In the example shown in the Figures, the seats 18, 20 include the front seat 18 and the rear seat 20 adjacent to the body side 14. In the examples shown in the Figures, the seats 18, 20 include one front seat 18 and rear seat 20 adjacent one body side 14 and another front seat 18 and rear seat 20 are therebetween and the respective side airbag 26, as described further below, is positioned to control the kinematics of the occupant of the seat 18, 20. In other words, the respective curtain airbag inflates along and between the seat 18, 20 and the body side 14.

The seats 18, 20 may be rotatable. In other words, the seats 18, 20 may rotate about a vertical axis that extends through the roof and the floor 36. For example, the seats 18, 20 may rotate between a forward-facing position, a rearward-facing position, a rightward-facing position, a leftward-facing position, and/or positions therebetween. In the forward-facing position, an occupant of the seat assembly 70 faces the front dash. The seat 18, 20 assemblies may rotate completely, i.e., 360°, about the vertical axis. The seat 18, 20 assemblies may rotate between fixed positions, e.g., the forward-facing position and the rearward-facing position, or may be rotatable to an infinite number of positions.

The seat 18, 20 includes the seat back 24 and a seat bottom 22. The seat back 24 may be supported by the seat bottom 22. The seat back 24 may be stationary or movable relative to the seat bottom 22. For example, the seat back 24 and the seat bottom 22 may be adjustable in multiple degrees of freedom.

The seat back 24 defines an occupant seating area. The occupant seating area is the area occupied by an occupant when properly seated on the seat 18, 20. The occupant seating area is on the vehicle-forward side of the seat back 24 and above the seat bottom 22.

With reference to the FIGS. 1-4, the assembly includes a side airbag assembly 56 mounted to the vehicle body 12. The side airbag assembly 56 includes the side airbag 26 and an inflator 58. In some examples, the side airbag assembly 56 may include a housing (not shown in the example in the Figures). As described further below, the side airbag 26 is mounted to the vehicle body 12 below the seat bottom 22 of the front seat 18 and rear seat 20. In the uninflated position, the airbag is below the seat bottom 22. In the uninflated position, the side airbag 26 may be rolled and/or folded on the vehicle body 12, e.g., on the floor 36. In the undeployed position, the side airbag 26 may be elongated along the vehicle-longitudinal axis. The airbag is inflatable upwardly between the body side 14 and the respective front seat 18 and rear seat 20 from the uninflated position to the inflated position. The airbag being below the seat bottom 22 of the front seat 18 and the seat bottom 22 of the rear seat 20 alleviates packaging constrains and accommodates the operation of the side airbag 26. In the event of a vehicle-side side impact, the side airbag 26 inflates to the inflated position to control the kinematics of the occupants of the front seat 18 and the rear seat 20.

As set forth above, the side airbag assembly 56 is mounted to the vehicle body 12 below the seat bottom 22 of the front seat 18 and the seat bottom 22 of the rear seat 20. Specifically, the side airbag 26 is mounted to the vehicle body 12 below the seat bottom 22 of the front seat 18 and the seat bottom 22 of the rear seat 20. The side airbag 26 may be directly or indirectly mounted to the vehicle body 12, e.g., with fasteners such as threaded fasteners, push-pins, Christmas-tree fasteners, etc. The side airbag assembly 56 may be mounted to the floor 36, as shown in the example in the Figures. As another example, in examples including the housing, the housing may be mounted to the vehicle body 12, e.g., the floor 36, and the side airbag 26 may be supported by and/or mounted to the housing.

In examples in which the side airbag assembly 56 is mounted to the floor 36, the floor 36 includes one or more carrier channels 60 housing the side airbag 26 and/or the inflator 58 in the uninflated position. In such an example, the side airbag 26 is completely recessed in the channel 60 in the uninflated position.

The side airbag 26 is inflatable to the inflated position between the front seat 18 and the body side 14 and between the rear seat 20 and the body side 14. Specifically, the side airbag 26 inflates upwardly between the front seat 18 and the body side 14 and between the rear seat 20 and the body side 14. The side airbag 26 is inflatable to the inflated position extending across the front door opening 34 and the rear door opening 34. Accordingly, the side airbag 26 controls the kinematics of occupants of both the front seat 18 and the rear seat 20, e.g., in the event of a vehicle-side side impact. As set forth further below, the tether retractor 28 is above the side airbag 26 in the uninflated position and pulls the side airbag 26 upwardly to the inflated position.

In the example shown in the Figures, the side airbag 26 includes two inflatable chambers 64, 66 namely a first inflatable chamber 64 and a second inflatable chamber 66. The first inflatable chamber 64 is positioned to control the kinematics of the occupant of the front seat 18 and the second inflatable chamber 66 is positioned to control the kinematics of the occupant of the rear seat 20. Specifically, the first inflatable chamber 64 is vehicle-forward of the second inflatable chamber 66. The adjectives "first" and "second" are used to merely identify the two chambers and do not indicate order or importance.

In the inflated position, the first inflatable chamber 64 is between the front seat 18 and the body side 14 and the second inflatable chamber 66 is between the rear seat 20 and the body side 14. As set forth above, the side airbag 26 is inflatable to the inflated position extending across the front door opening 34 and the rear door opening 34. Specifically, in the inflated position, the first inflatable chamber 64 is at the front door opening 34 and the second inflatable chamber 66 at the rear door opening 34.

The first inflatable chamber 64 and the second inflatable chamber 66 each include an inflation chamber 48, 50. The inflation chamber 48, 50 of the first inflatable chamber 64 and the inflation chamber 48, 50 of the second inflatable chamber 66 may be fluidly separated from each other and/or may be independently inflatable. The side airbag 26 may include an uninflatable panel 68 between the first inflatable chamber 64 and the second inflatable chamber 66. Specifically, the uninflatable panel 68 may extend from the first inflatable chamber 64 to the second inflatable chamber 66. In such an example, the first inflatable chamber 64, the second inflatable chamber 66, and the uninflatable panel 68 may be generally in a common plane that is generally parallel to the adjacent body side 14. The uninflatable panel 68 may be at the pillar 38 when the side airbag 26 is in the inflated position. The inflation of first inflatable chamber 66 and the second inflatable chamber 64 pull the uninflatable panel 68 to deploy the uninflatable panel 68. The uninflatable panel 68 is not in fluid communication with the first inflatable chamber 66 and the second inflatable chamber 64. The uninflatable panel 68 does not include a chamber inflatable by inflation medium and does not come into direct contact with the inflation medium. In other words, the uninflatable panel 68 does not inflate.

The first inflatable chamber 64, the second inflatable chamber 66, and the uninflatable panel 68 may be separate panels that are stitched together. As another example, the inflatable chamber, the second inflatable chamber 66, and the uninflatable panel 68 may be unitary, e.g., one-piece woven. The side airbag 26 may be formed of any suitable airbag material, e.g., from a woven polymer. For example, the airbag may be formed of lightweight high strength orientated-strand fabric material, e.g., from ultra-high molecular weight polyethylene (UHMwPE), such as that commercially available under the tradename Dyneema®, auxetic yarn, etc., to resist tearing and/or puncturing. Other suitable examples include woven nylon yarn, e.g., nylon, polyether ether ketone (PEEK), polyetherketoneketone (PEKK), polyester, or any other suitable polymer. The woven polymer may include a coating such as silicone, neoprene, urethane, polyorganosiloxane, etc.

As set forth above, the first inflatable chamber 64 and the second inflatable chamber 66 may be independently inflatable. In other words, the first inflatable chamber 64 is not in fluid communication with the second inflatable chamber 66. The side airbag assembly 56 includes at least one inflator 58. In one example, one inflator 58 may inflate both the first inflatable chamber 64 and the second inflatable chamber 66, e.g., through separate fill tubes. As another example, the side airbag assembly 56 may include one inflator 58 in fluid communication with the first inflatable chamber 64 and another inflator 58 in fluid communication with the second inflatable chamber 66.

The inflator 58 may be mounted to the vehicle body 12 below the seat bottom 22 of the front seat 18 and the seat bottom 22 of the rear seat 20. The inflator 58 may be directly or indirectly mounted to the vehicle body 12, e.g., with fasteners such as threaded fasteners, push-pins, Christmas-tree fasteners, etc. The inflator 58 may be mounted to the floor 36, as shown in the example in the Figures. As another example, in examples including the housing, the housing may be mounted to the vehicle body 12, e.g., the floor 36, and the inflator 58 may be supported by and/or mounted to the housing.

The inflator 58 expands the side airbag 26 with inflation medium, such as a gas, to move the airbag from the uninflated position to the inflated position. The inflator 58 may be, for example, a pyrotechnic inflator 58 that ignites a chemical reaction to generate the inflation medium, a stored gas inflator 58 that releases (e.g., by a pyrotechnic valve) stored gas as the inflation medium, or a hybrid. The side airbag assembly 56 may include any suitable number of inflators 58. In the example shown in the Figures, the side airbag assembly 56 includes one inflator 58 to inflate the side airbag 26 to the inflated position, i.e., the inflator 58 inflates the first inflatable chamber 64 and the second inflatable chamber 66.

As set forth above, the side airbag 26 is inflatable upwardly along the seat back 24 of the front seat 18 and the seat back 24 of the rear seat 20. The side airbag 26 may be designed to extend alongside the occupant seating area in the inflated position. In the inflated position the first inflatable chamber 64 and the second inflatable chamber 66 may extend along the from the floor 36 towards the roof to provide coverage to a hip and/or a torso of an occupant seated in the occupant seating area. Specifically, in the inflated position, the first inflatable chamber 64 is between the occupant seating area of the front seat 18 and the body side 14 and the second inflatable chamber 66 is between the occupant seating area of the rear seat 20 and the body side 14. In the inflated position, the first inflatable chamber 64 may extend from the floor 36 to a top of the seat back 24 of the front seat 18 and the second inflatable chamber 66 may extend from the floor 36 to a top of the seat back 24 of the rear seat 20.

In the event of a vehicle 32 impact, the tether retractor 28 pulls the tether 30 upwardly as the side airbag 26 inflates from the uninflated position to the inflated position. The tether retractor 28 and the tether 30 may assist, for example, with positioning the side airbag 26 during a vehicle impact to control the kinematics of occupants of the front seat 18 and/or the rear seat 20.

As set forth above, the tether retractor 28 is mounted to the vehicle body 12. The tether 30 is connected to the side airbag 26, e.g., the uninflatable panel 68 of the side airbag 26, and the tether retractor 28. Specifically, the tether 30 is operatively connected to the tether retractor 28 so that the tether retractor 28 retracts the tether 30 into the tether retractor 28 to pull the side airbag 26 upwardly. The tether retractor 28 is mounted above the seat bottom 22 of the front seat 18 and the seat bottom 22 of the rear seat 20 to pull the side airbag 26 upwardly. Specifically, the tether retractor 28 may be mounted above the seat back 24 of the front seat 18 and the seat back 24 of the rear seat 20.

The tether retractor 28 may be, for example, mounted to the B-pillar. As another example, the tether retractor 28 may be mounted to any suitable part of the body side 14 or the vehicle 32 roof. In the uninflated position, the tether 30 may be disposed along the B-pillar between the B-pillar and a trim panel on the B-pillar. In other words, the trim panel may conceal the tether 30 in the uninflated position. During inflation of the side airbag 26 and retraction of the tether 30, the tether 30 breaks the trim panel, e.g., by releasing trim panel from the B-pillar, splitting a tear seam on the B-panel, etc.

The tether retractor 28 may be pyrotechnically activated to pull the side airbag 26 upwardly as the side airbag 26 inflates to the inflated position. In such an example, the tether retractor 28 includes a pyrotechnic charge in a housing. The pyrotechnic charge is activated to retract the tether 30. The pyrotechnic device may be, for example, a rotary retractor. The pyrotechnic charge is combustible to produce a gas, e.g., to retract a piston or turn a wheel, to retract the tether 30 into the housing of the retractor. The pyrotechnic charge may be a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$). The tether 30 may be cloth, fabric, metal, polymeric, or any suitable type of material. The tether retractor 28 may be in fluid communication with the inflator 58 i.e., the tether retractor 28 may activate simultaneously with the inflator 58.

Figure 6:
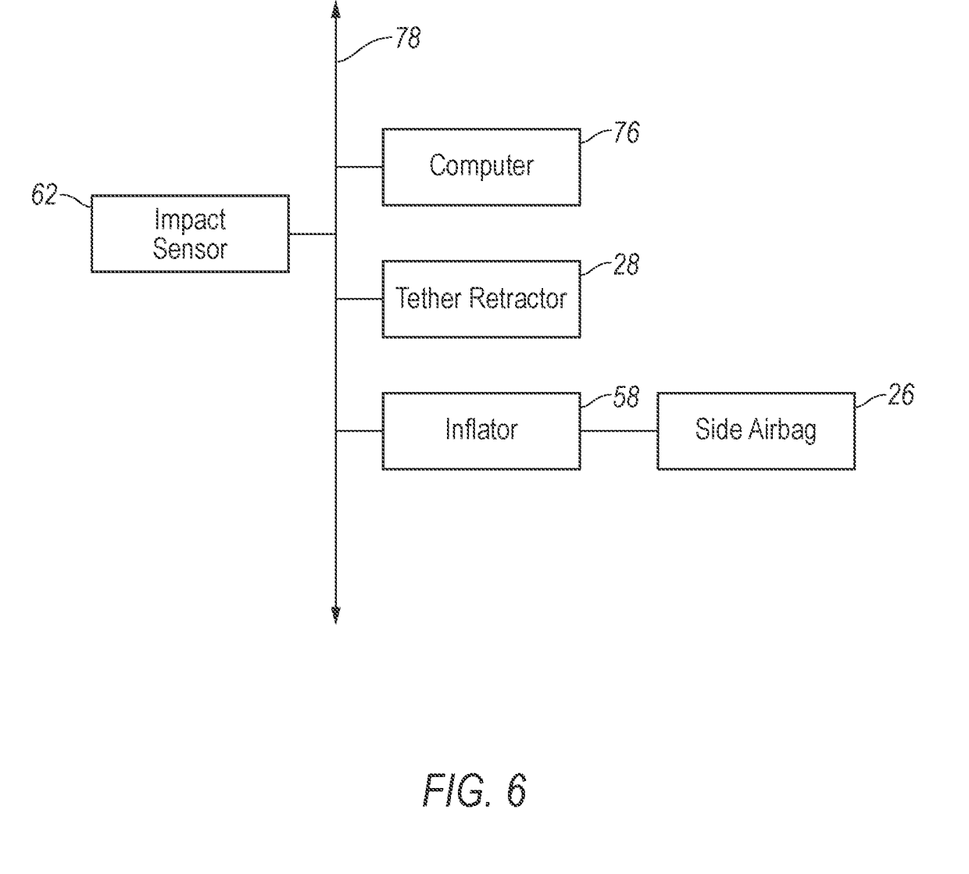
FIG. 6 is a block diagram of a system of the vehicle.

With reference to the Figures, the vehicle 32 includes a computer 76 that controls the inflation of the side airbag 26 based on input from impact sensors 62. Use of "in response to," "based on," and "upon determining" herein indicates a causal relationship, not merely a temporal relationship. The computer 76 may be, for example, a restraints control module. The computer 76 includes a processor and a memory. The memory includes one or more forms of computer 76 readable media, and stores instructions executable by the computer 76 for performing various operations, including as disclosed herein. For example, a computer 76 can be a generic computer 76 with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 76 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 76. The memory can be of any type, e.g., hard disk drives, solid state drives, servers, or any volatile or non-volatile media. The memory can store the collected data sent from the sensors. The memory can be a separate device from the computer 76, and the computer 76 can retrieve information stored by the memory via a network in the vehicle 32, e.g., over a CAN bus, a wireless network, etc. The computer 76 is generally arranged for communications on a vehicle communication network 78 that can include a bus in the vehicle 32 such as a controller area network CAN or the like, and/or other wired and/or wireless mechanisms. Alternatively or additionally, in cases where the computer 76 includes a plurality of devices, the vehicle communication network 78 may be used for communications between devices represented as the computer 76 in this disclosure. Further, as mentioned below, various controllers and/or sensors may provide data to the computer 76 via the vehicle communication network 78.

The vehicle 32 may include at least one impact sensor 62 for sensing impact of the vehicle 32. The impact sensor 62 is in communication with the computer 76. The computer 76 may activate the actuator, e.g., provide an impulse to a pyrotechnic charge of the inflator 58 when the impact sensor 62 senses pedestrian impact. The impact sensor 62 is configured to detect an impact to the vehicle 32. The impact sensor 62 may be of any suitable type, for example, post-contact sensors such as accelerometers, pressure sensors, and contact switches; and pre-impact sensors 62 such as radar, LIDAR, and vision-sensing systems. The vision-sensing systems may include one or more cameras, CCD image sensors, CMOS image sensors, etc. The impact sensor 62 may be located at numerous points in or on the vehicle 32.

During a vehicle 32 impact, the front seat 18 and the rear seat 20 may be in any one of a number of positions and may be facing in any one of a number of directions, e.g., a vehicle-forward direction, a vehicle-side rearward direction, etc. During a vehicle 32 impact, the side airbag 26 is inflated from the uninflated position, as shown in FIG. 1, to the inflated position, as shown in FIGS. 2-5. The tether retractor 28 retracts the tether 30 to pull the side airbag 26 upwardly along the body side 14 between the front seat 18 and the body side 14 and between the rear seat 20 and the body side 14. Specifically, the computer 76 activates the inflator 58 and the tether retractor 28 to inflate the side airbag 26 and the pull the side airbag 26 upwardly. In the inflated position, the first inflatable chamber 64 is between the front door opening 34 and the front seat 18 in the inflated position and the second inflatable chamber 66 is between the rear door opening 34 and the rear seat 20 in the inflated position. Accordingly, the side airbag 26 controls the kinematics of occupants of both the front seat 18 and the rear seat 20.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly comprising:
a vehicle body having a body side;
a front seat and a rear seat adjacent the body side, the front seat and the rear seat each including a seat bottom and a seatback extending upwardly from the seat bottom, the seatback of the front seat being at a vehicle-longitudinal position along a vehicle-longitudinal axis, the seatback of the rear seat being at a vehicle-longitudinal position along the vehicle-longitudinal axis vehicle-rearward of the vehicle-longitudinal position of the seatback of the front seat;
a side airbag mounted to the vehicle body below the seat bottom of the front seat and the rear seat;
a tether retractor mounted to the body side vertically higher than the seat bottoms of the front seat and the rear seat and vertically higher than the side airbag, the tether retractor being at a vehicle-longitudinal position along the vehicle-longitudinal axis between the vehicle-longitudinal positions of the seatbacks; and
a tether extending from the side airbag to the tether retractor.

2. The assembly as set forth in claim 1, wherein the side airbag is inflatable to an inflated position, the side airbag in the inflated position including a first inflatable chamber between the front seat and the body side and a second inflatable chamber between the rear seat and the body side.

3. The assembly as set forth in claim 2, further comprising an uninflatable panel between the first inflatable chamber and the second inflatable chamber.

4. The assembly as set forth in claim 3, wherein the tether is connected to the uninflatable panel.

5. The assembly as set forth in claim 4, wherein the first inflatable chamber and the second inflatable chamber each include an inflation chamber, the inflation chamber of the first inflatable chamber and the inflation chamber of the second inflatable chamber being fluidly separated from each other with the uninflatable panel extending from the first inflatable chamber to the second inflatable chamber.

6. The assembly as set forth in claim 1, wherein the body side includes a front door opening and a rear door opening, the side airbag being inflatable to an inflated position extending across the front door opening and the rear door opening.

7. The assembly as set forth in claim 6, wherein the side airbag includes a first inflatable chamber at the front door opening and a second inflatable chamber at the rear door opening in the inflated position.

8. The assembly as set forth in claim 1, wherein the body side includes a front door opening, a rear door opening, and a pillar between the front door opening and the rear door opening, the tether retractor being mounted to the pillar.

9. The assembly as set forth in claim 8, wherein the side airbag is inflatable to an inflated position extending across the front door opening and the rear door opening.

10. The assembly as set forth in claim 8, wherein the side airbag includes a first inflatable chamber at the front door opening and a second inflatable chamber at the rear door opening in an inflated position.

11. The assembly as set forth in claim 10, wherein the side airbag includes an uninflatable panel between the first inflatable chamber and the second inflatable chamber, the uninflatable panel being at the pillar when the side airbag is in the inflated position.

12. The assembly as set forth in claim 1, wherein the vehicle body includes a floor and the side airbag is inflatable upwardly from the floor.

13. The assembly as set forth in claim 1, wherein the tether retractor is pyrotechnically activated.

14. The assembly as set forth in claim 1, wherein the tether retractor is mounted to the body side vertically higher than the seatbacks of the front seat and the rear seat.

15. The assembly as set forth in claim 1, wherein the side airbag is inflatable to an inflated position between the front seat and the body side and between the rear seat and the body side.

16. The assembly as set forth in claim 15, wherein the side airbag includes a first inflatable chamber adjacent the front seat and a second inflatable chamber adjacent the rear seat in the inflated position.

17. The assembly as set forth in claim 16, wherein the body side includes a front door opening and a rear door opening, the first inflatable chamber being between the front door opening and the front seat in the inflated position, the second inflatable chamber being between the rear door opening and the rear seat in the inflated position.

18. The assembly as set forth in claim 17, wherein the body side includes a pillar between the front door opening and the rear door opening, the tether retractor being mounted to the pillar.

19. The assembly as set forth in claim 1, wherein the side airbag is inflatable upwardly along the seatback of the front seat and the seatback of the rear seat.

20. An assembly comprising:
a vehicle body having a body side;
the body side including a front door opening and a rear door opening;
a front seat and a rear seat adjacent the body side, the front seat and the rear seat each including a seat bottom and a seatback extending upwardly from the seat bottom;
a side airbag mounted to the vehicle body below the seat bottom of the front seat and the rear seat;
the side airbag being inflatable to an inflated position, the side airbag in the inflated position including a first inflatable chamber between the front seat and the front door opening and a second inflatable chamber between the rear seat and the rear door opening;
the side airbag including an uninflatable panel between the first inflatable chamber and the second inflatable chamber;
a tether retractor mounted to the body side vertically higher than the seat bottoms and the side airbag to pull the side airbag upwardly along the seat bottoms and the seat backs; and
a tether extending from the side airbag to the tether retractor, the tether being connected to the uninflatable panel, the tether being operatively connected to the tether retractor so that the tether retractor retracts the tether into the tether retractor to pull the side airbag upwardly.

* * * * *